United States Patent [19]

Dittman

[11] 4,068,859
[45] Jan. 17, 1978

[54] COMBINED FUEL TANK PROTECTIVE COVER AND THIGH GRIP PAD FOR MOTORCYCLES

[76] Inventor: Melvin M. Dittman, 17513 - 32nd Ave. W., Lynnwood, Wash. 98036

[21] Appl. No.: 695,264

[22] Filed: June 11, 1976

[51] Int. Cl.² .............................................. B62J 7/00
[52] U.S. Cl. ................................. 280/289 E; 224/32 R
[58] Field of Search ............................... 180/35, 33 R; 280/289 E, 289 S, 289 G, 289 R; 224/29 R, 34, 42.42 R, 32 R; 150/52 K; 296/78.1; 2/263

[56] References Cited

U.S. PATENT DOCUMENTS

| | | | |
|---|---|---|---|
| 1,015,474 | 1/1912 | Bullock | 150/52 K |
| 2,029,875 | 2/1936 | Kispert | 2/263 X |
| 3,537,746 | 11/1970 | Peters | 296/78.1 |

FOREIGN PATENT DOCUMENTS

| | | | |
|---|---|---|---|
| 2,234,173 | 1/1975 | France | 224/32 R |
| 1,156,514 | 7/1955 | France | 296/78.1 |
| 71,817 | 9/1952 | Netherlands | 280/289 G |
| 223,712 | 10/1924 | United Kingdom | 280/289 E |
| 446,438 | 4/1936 | United Kingdom | 180/35 |

Primary Examiner—Joseph F. Peters, Jr.
Assistant Examiner—R. Schrecengost
Attorney, Agent, or Firm—Christensen, O'Connor, Garrison & Havelka

[57] ABSTRACT

A combined protective cover and rider's safety leg grip pad device for removable mounting on a motorcycle fuel tank. A flexible pad panel enwrapping the fuel tank is maintained under tension by removable connector means extending between opposite side edges of the pad panel beneath the tank, such edges being stiffened by rods extending longitudinally through hem loops formed along such side edges and forming a means of attachment for the fastener means.

9 Claims, 4 Drawing Figures

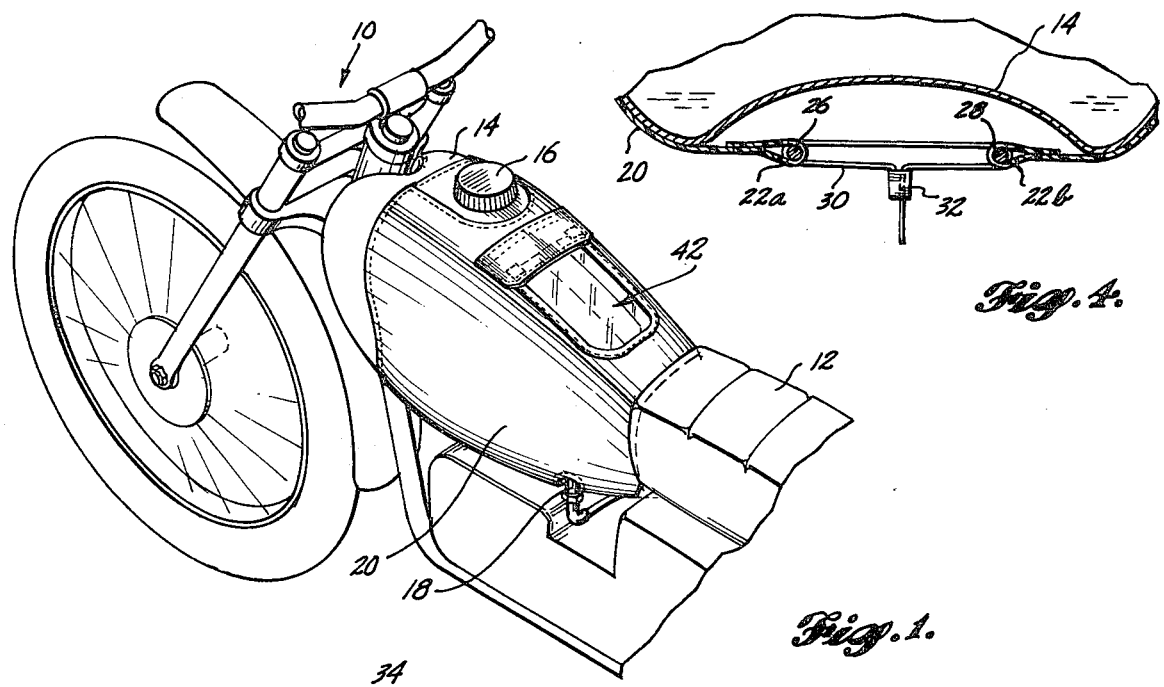
Fig. 4.
Fig. 1.
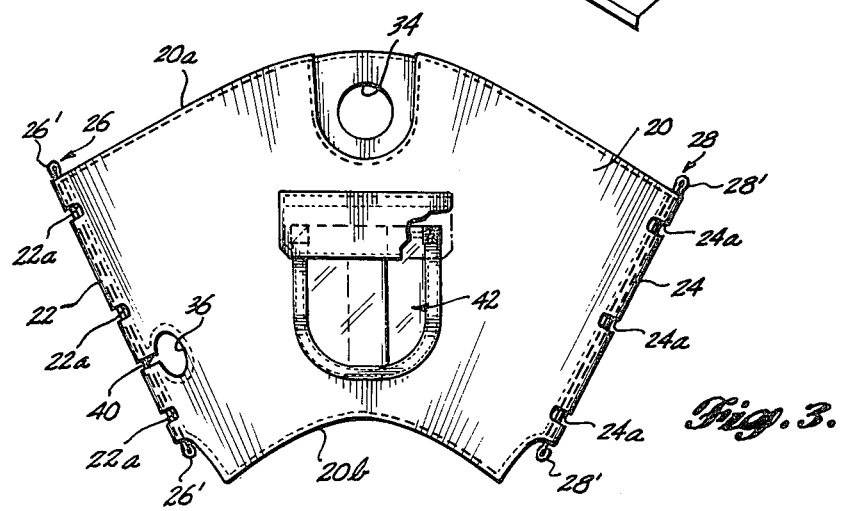
Fig. 3.
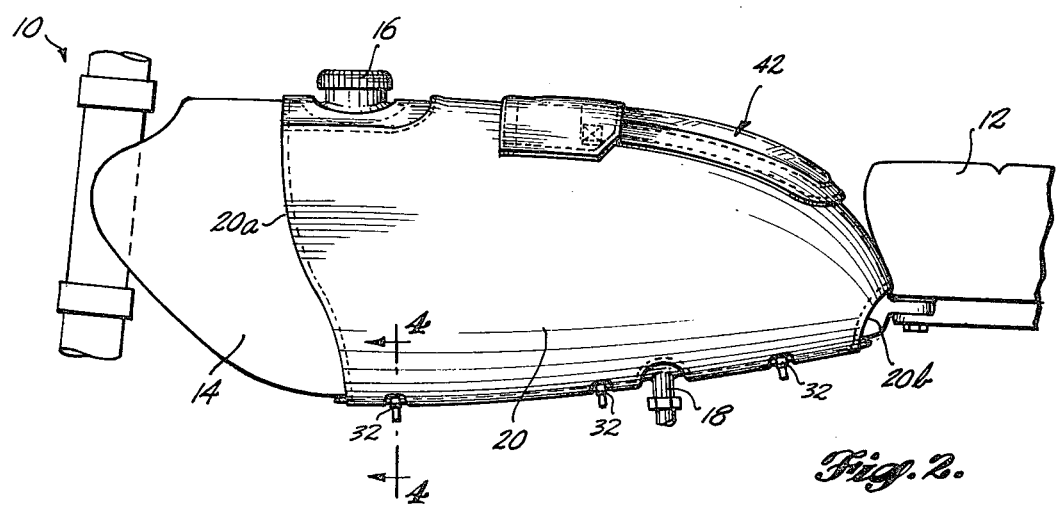
Fig. 2.

COMBINED FUEL TANK PROTECTIVE COVER AND THIGH GRIP PAD FOR MOTORCYCLES

BACKGROUND OF THE INVENTION

This invention relates to an accessory device for motorcycles and more particularly for motorcycles used in cross-country, hill climbing and dirt track events characterized by rough riding conditions and a profusion of dirt, sand and mud thrown upon the vehicle and rider. The invention is herein illustratively described by reference to the presently preferred embodiment thereof; however, it will be recognized that certain modifications and changes therein with respect to details may be made without departing from the essential features involved.

Under the aforementioned motorcycle riding conditions, much of the rider's ability to remain seated upon maintaining a grip of the fuel tank between the rider's knees and thighs straddling the tank. However, motorcyclists typically keep their equipment well polished, so the tank surface is usually slippery. This makes it difficult for the rider to maintain a secure grip on the tank sides and in the attempt to do so the pressure and sliding of the rider's clothing against the tank surfaces of the tank soon wears off the surface finish and may damage the rider's clothing, particularly if it is leather, due to the abrasive action of sand, dirt and mud being worked between the hard surface of the tank and the softer clothing.

It is accordingly an object of this invention to provide not only a safety accessory for motorcycle rider's by improving the security of the retaining grip that the rider can achieve with leg pressure, but also one that protects the fuel tank surfaces and the rider's clothing by interposing a relatively soft and yielding layer between them that itself can withstand the abrasion and that minimizes the reactive abrasion on the rider's clothing.

Still another object of this invention is to provide an attractively presentable device of the nature indicated that can be readily installed and removed without necessity of dismantling or disconnecting any fittings or parts of the motorcycle.

Still another object is to devise such a protective device that lends itself to varying aesthetic and decorative designs and may serve other functions beyond those already indicated, such as a mount for a conveniently accessible pouch in which to carry articles such as a driver's license, map, wallet, etc.

BRIEF DESCRIPTION OF INVENTION

As herein disclosed the combined protective and safety device mountable removably on motorcycle fuel tanks for the described purposes comprises a bad panel member of flexible soft sheet material of predetermined outline shape suited to the motorcycle tank configuration. The pad panel member has a transverse span between opposite side edges to permit drawing such edges transversely inward into manual proximity beneath the fuel tank with said panel member transversely enwrapping said tank. Such pad panel member is maintained in tension in such position by fastener means removably interconnecting said side edges beneath the fuel tank, hence at a location where the connections and the gap between side edges are visually inconspicuous and offer no obstruction to comfortable use of the pad device.

As a further and more specific feature, the opposite side edges of the panel member are hemmed to form longitudinally extending loops that accommodate insertable and preferably removable stiffener rods. Apertures at interval locations along the lengths of such hem loops provide access for removable attachment of the fastener means to the stiffener rods. Removability of one such stiffener rod facilitates installation and removal of the pad device by providing open slot access to and from an aperture required to accommodate a fuel outlet line or valve fitting overlapped by the installed protective device.

As still another feature the device preferably includes a top-mounted pouch useful to store articles like driver's license, maps, wallet, etc., without interferring with the normal or intended functioning of the pad device.

These and other features, objects and advantages of the invention will become more fully apparent from the following description by reference to the accompanying drawings.

BRIEF DESCRIPTION OF DRAWINGS

FIG. 1 is a top perspective view of a portion of a typical motorcycle with the device installed.

FIG. 2 is a side elevation view of a portion of the motorcycle with the device installed.

FIG. 3 is a face (top) view of the device laid out flat to show its developed outline configuration.

FIG. 4 is a transverse sectional view illustrating a fastener arrangement for securing the side edges of the pad panel member together beneath the fuel tank.

DETAILED DESCRIPTION OF THE PREFERRED EMBODIMENT

In the drawings, motorcycle 10, typical of most, has a suitable rider's seat 12, forwardly of which the conventional fuel tank 14 is mounted in position where it can be staddled and gripped between the rider's thighs and knees. The tank has a filler cap 16 on top, and an associated fuel outlet line and fitting 18 at the bottom adjacent one side. The size and configuration of fuel tanks on different motorcycles vary; hence it will be appreciated that the specific size and configuration of the protective and safety device of this invention required to fit the tank is subject to some design variation suiting different vehicles. Basically, however, it is preferably constructed of a pad panel 20 of soft flexible sheet material such as polyvinyl chloride backed by soft knitted fabric bonded to the back face of the plastic. The fabric backing is to lie in protective contact with the finished surface of the fuel tank 14. The vinyl facing itself is somewhat leathery in texture and finish, such that it affords a nonslip gripping surface for the rider's legs.

The fuel tank diverges forwardly from its rearward end and then converges toward its forward end. Usually the bottom face is convex upward or flat (see FIG. 4). The pad panel 20, cut to enwrap and fit the tank portion to be protectively covered and presented as a gripping pad, preferably has rearwardly convergent opposite side edges 22 and 24 that are straight and arcuate forward and rearward edges 20a and 20b that are respectively convex and concave. The forward arcuate edge 20a is thus materially longer than the rearward edge 20b and is formed on a substantially longer radius. The resultant fit depicted in FIGS. 1 and 2 places the forward arcuate edge 20a slightly forward of filler cap 16 and the rearward edge 20b slightly forward of the seat 12. The opposite side edges 22 and 24 then lie apart a short distance approximately parallel to each other beneath the tank (FIG. 4.).

The forward and rearward edges 20a and 20b, respectively, are hemmed for protection and appearance. The opposite side edges 22 and 24 are also hemmed, but with a large hem overlap to form end-opening loops 22a and 22b sufficiently large to receive removable metal stiffener rods 26 and 28, respectively, inserted lengthwise through those loops so as to stiffen and reinforce the side edges. The stiffener rod 26 has eyes or enlargements 26' formed at opposite ends thereof that project slightly beyond the ends of its receiving pad edge loop and that serve as detents preventing unintended dislodgement of the rod. Rod 28 has similar enlargements 28' formed at its opposite ends for the same purpose.

At corresponding interval locations along the length of each opposite side edge 22 and 24, there are slots 22a and 24a, respectively, providing access for securing fastener elements to the stiffener rods where they pass the slots. As shown in FIG. 4, for example, a suitable fastener comprises an elongated strip of nylon or other tough plastic material 30 looped around the stiffener rods through correspondingly located slots 22a, 24a. The fastener strip 30 is drawn tight through a locking device 32 of suitable or conventional form on one end of the fastener strip 30, thereby drawing the opposite side edges 22 and 24 into proximity beneath the fuel tank to establish tension in the cover pad panel enwrapping the tank. With such fasteners tightened at suitable intervals along the length of the opposite side edges, a snug and conforming fit of the protective cover device is secured in relation to the fuel tank. The vinyl material itself will stretch elastically to a certain degree, and its backing of knitted soft fabric material will permit it to stretch so as to secure a conforming snug fit with the fuel tank, attractive to the eye and secure against dislodging or striking forces exerted by the rider's legs. Positional security is further assured by lodgement of the fuel tank filler spout and cap 16 in a suitably located aperture 34 in cover panel 20. Similarly, it is also fostered to a degree by lodgement of the outlet petcock or fuel line fitting 18 in a suitable aperture 36 formed in the pad panel 20. A slot or break 40 in the panel member hem formation leading inwardly into the aperture 36 permits mounting and dismounting of the cover without disconnecting the fuel line fitting 18. This is accomplished by temporarily withdrawing the reinforcing rod 26 to pass the fuel line fitting and then reinserting the stiffener rod 26 before the fasteners 30 are installed and tightened to tension the cover.

A carrier pouch 42 may be installed on the cover at a suitable top location aft of the aperture 34. This convenience pouch can be used to protect maps, drivers licenses or other articles. Multi-hook and opposing multi-loop type synthetic pad ("Velcro") fastener elements may be used to secure a pouch cover flap as depicted in FIG. 3.

By utilizing the proper material for the combined protective cover and thigh grip pad device, such as polyvinyl chloride backed by knitted soft fabric, and securely mounting the device conformably upon the fuel tank of the motorcycle, a more secure and otherwise effective gripping surface is afforded to the rider to maintain his seat on the vehicle during rough riding conditions than heretofore. Moreover the rider's clothing and particularly the finished surfaces of the fuel tank are also protected against abrasion and abrasive wear from soil particles and the pressure of the rider's legs. When the vehicle is to be washed and rewaxed, the cover device is easily and quickly removed from the fuel tank by appropriate removal of the fastenings 30, followed by removal of the stiffener rod 26 which permits the cover to be slipped off the fuel tank. The cover itself may of course then be separately cleaned, ready for reuse on the next occasion.

These and other aspects of the invention will be appreciated by those skilled in the art base on the present disclosure of its preferred embodiment within the scope of the claims that follow.

What is claimed is:

1. A combined protective cover and rider's leg grip pad device for removable mounting on a motorcycle fuel tank having contiguous top, sides and bottom exterior surfaces extending forwardly from the motorcycle rider's seat, said cover and grip pad device comprising a pad panel member of flexible and elastically stretchable sheet material having a transverse span between opposite side edges to permit drawing such edges transversely inward into mutual proximity beneath the tank with said panel member draped transversely over and enwrapping said tank, and fastener means for removably interconnecting said opposite edges extending inwardly into mutual proximity beneath the tank with the panel member maintained thereby in tension enwrapping the tank and stretched transversely of such panel member througout the length thereof so as to conform to and snugly fit the fuel tank.

2. The device defined in claim 1 wherein the pad member opposite side edges are hemmed longitudinally to form loops extending along said edges and are slotted at interval locations along the length of such loops, and a stiffener rod extending reinforcingly lengthwise through each such loop, the fastener means being connected to and extending between the stiffener rods of said opposite side edges through such slots.

3. The device defined in claim 2 wherein the pad panel member has at least one aperture therein situated intermediate its edges and adapted to accommodate a fuel tank fitting projecting therethrough.

4. The device defined in claim 3 wherein th pad panel member has an enclosure pouch formed on its top when mounted, adapted for storage of materials therein.

5. The device defined in claim 1 wherein the pad panel member has an enclosure pouch formed on its top when mounted, adapted for storage of materials therein.

6. The device defined in claim 2 wherein the pad panel member comprises a soft flexible plastic material.

7. The device defined in claim 6 wherein the plastic is backed by a soft fabric bonded thereto, for contacting the fuel tank surfaces.

8. The device defined in claim 2 wherein the pad panel member has an aperture therein located and sized to accomodate a fuel tank outlet fitting adjacent the base and one side of the tank and a slot leading from one side edge of the pad panel member into said aperture, which slot is opened by removal of the associated stiffener rod in the edge loop.

9. The device defined in claim 6 wherein the plastic material comprises polyvinyl chloride.

* * * * *